United States Patent [19]

Sugimoto

[11] Patent Number: 4,495,801
[45] Date of Patent: Jan. 29, 1985

[54] MANIPULATOR FOR SHIFTING SPEED CHANGING GEARS IN AUTOMOTIVE VEHICLES

[75] Inventor: Hiroshi Sugimoto, Kobe, Japan
[73] Assignee: Mitsubishi Denki Kabushiki Kaisha, Tokyo, Japan
[21] Appl. No.: 384,761
[22] Filed: Jun. 3, 1982

[30] Foreign Application Priority Data

Jul. 15, 1981 [JP] Japan .............................. 56-111133

[51] Int. Cl.³ .......................................... G01M 15/00
[52] U.S. Cl. .................................. 73/117; 74/473 P
[58] Field of Search ............... 73/117, 118; 74/473 P, 74/473 SW

[56] References Cited

U.S. PATENT DOCUMENTS 3,713,332 1/1973 Herrbrich ............................. 73/117
4,271,728 6/1981 Wakamatsu .................. 74/473 P X

OTHER PUBLICATIONS

Japanese Unexamined Patent Publication No. 1402/1971, "Operating Device for Automatically Operating an Actuation Device of a Vehicle Especially a Car".

"Nikkei Mechanical", vol. 8-31, 1981, pp. 60-61, System Manufactured by K. K. Meidensha.

Primary Examiner—Jerry W. Myracle
Attorney, Agent, or Firm—Oblon, Fisher, Spivak, McClelland & Maier

[57] ABSTRACT

An automobile driving robot device capable of detecting variations in a relative position between a speed changing mechanism of the automobile and a device for operating the speed changing mechanism, and of rectifying a reference point for operating the speed changing mechanism operating device, the detecting operation being done by projecting light to the speed changing mechanism, and then finding out variations in the position of the speed changing mechanism by way of the direction and distance of movement of the light reflected from the speed changing mechanism.

4 Claims, 5 Drawing Figures

MANIPULATOR FOR SHIFTING SPEED CHANGING GEARS IN AUTOMOTIVE VEHICLES

BACKGROUND OF THE INVENTION

1. Field of the Invention

This invention relates to a robot device, or a manipulator, which is capable of shifting a speed changing mechanism of an automotive vehicle in place of human being. More particularly, it is concerned with an automobile driving robot device having a transmission mechanism operating device.

2. Description of the Prior Art

For a better understanding of the invention, the conventional transmission mechanism operating device for this kind of robot device will be explained in reference of FIGS. 1, 2A and 2B of the accompanying drawing.

FIG. 1 shows an interior of an automobile cabin, wherein a reference numeral 1 designates a vehicle body, a numeral 2 refers to a transmission (or speed changing) mechanism, a reference numeral 3 denotes a transmission operating lever projecting from the main body 2a of the transmission mechanism 2, a reference numeral 4 designates pedals, and a numeral 5 refers to the transmission mechanism operating device in the robot device. In this transmission mechanism operating device 5, an operating link 7, which is to be joined to the transmission operating lever 3 at one end thereof, is connected with an operating shaft projected from the main body 5a of the transmission operating device 5 at other end thereof through a crank. A numeral 10 refers to a portion of a passenger seat or a vehicle body, on which the main body 5a of the transmission mechanism operating device 5 is installed.

FIGS. 2A and 2B are explanatory diagrams for explaining the operating principle of the transmission mechanism operating device shown in FIG. 1. It is to be noted that, in FIGS. 2A and 2B, those parts which are identical with those in FIG. 1 are designated by the same reference numerals.

In the drawing, a numeral 11 refers to a rubber cushion for mounting the main body 2a of the transmission mechanism 2 on the vehicle body 1 with a certain degree of freedom.

As shown by a dot-and-dash line in FIG. 2A, the speed changing operation can be done by shifting the operating lever 3 of the transmission mechanism 2 along slots or channels in the form of a letter "H", or a design like "╫". In the case of manual shifting of the abovementioned operating lever 3 by human being, it is shifted by hand. However, when durability of the transmission mechanism 2 is to be tested, several hundred thousands of operations are required, which operations are extremely difficult to be performed with human hands. It is therefore contemplated that the speed changing lever 3 is operated mechanically by use of a robotized transmission mechanism operating device 5 without requiring a human operator. In more detail, for shifting the speed changing lever 3 in the left and right directions, the operating shaft 6 is linearly moved in a manner to slide into and out of the main body 5a of the transmission mechanism operating device 5. Also, for moving the speed changing lever 3 in the back and forth directions, the operating link 7 is moved back and forth by rotating the operating shaft 6 on its axis.

With the above-described basic movements as the fundamentals for the speed changing operations, the position of the speed changing lever 3 at every mode of its speed changing operation is memorized so that the transmission mechanism operating device 5 may shift the speed changing lever 3 to a required position in a sequential and repeated manner in accordance with speed changing instructions such as, for example, "third speed", "forth speed", and so on.

Incidentally, the abovementioned main body 5a of the operating device 5 is mounted on one part 10 of the passenger seat or the vehicle body, while the main body 2a of the speed changing mechanism 2 is mounted on the vehicle body 1 through a rubber cushion 11. Such way of mounting is to prevent vibration or to secure safety by providing an escape against deformation of the vehicle body during cruising of the automobile, the expedient of which is therefore indispensable. As the result of adopting such mounting expedient, however, there arise inconveniences to be described hereinbelow in the conventional robotized operating device for the speed changing mechanism. That is to say, as shown by a dash line in FIG. 2B, the speed changing mechanism 2 possibly takes an inclined position from its originally mounted position as shown by a solid line in the same drawing with respect to the vehicle body. Such tilting phenomenon is often seen as a very common phenomenon when a large torque is applied to an output shaft of the speed changing mechanism 2. In case this speed changing mechanism 2 is tilted, the transmission mechanism operating device 5 for the speed changing mechanism 2 remains at its mounted positioned, on account of which there occurs the same movement as that when the speed changing lever 3 is shifted with the consequence that there are brought about such inconveniences that the gear is disengaged unexpectedly during the driving, or the speed changing lever 3 can not be engaged at a predetermined gear position. And, by the abovementioned phenomenon to occur in the speed changing mechanism 2, the position and posture of the speed changing mechanism 2 vary in all directions, i.e., left-and-right, back-and-forth, up-and-down, with the consequence that the operation of the transmission mechanism operating device 5 becomes extremely difficult, and, in some cases, the operating device for the transmission mechanism is disadvantageously unable to exhibit its function to the fullest extent.

SUMMARY OF THE INVENTION

The present invention has been made with a view to removing various disadvantages inherent in the conventional transmission mechanism operating device as mentioned in the foregoing.

It is therefore an object of the present invention to provide an automobile driving robot device which is capable of detecting variations in relative position between the speed changing mechanism operating device and the speed changing (or transmission) mechanism to be operated thereby, or variations in the relative position and moving direction of the transmission mechanism with respect to the transmission mechanism operating device and rectifying a reference point for operation of the speed changing mechanism operating device so that the movement of the speed changing mechanism can be apparently negligible.

According to the present invention in its general aspect, there is provided an automobile driving robot device having a speed changing mechanism operating device, and device being provided with means for detecting variations in a relative position between a speed changing mechanism to be operated and said speed changing mechanism operating device, or variations in the relative position and moving direction of said speed changing mechanism to be operated with respect to said speed changing mechanism operating device, and for rectifying a reference point for operating said speed changing mechanism operating device.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claim appended hereto. Those skilled in the art will appreciate that the conception, upon which this disclosure is based may readily be utilized as a basis for the designing of other structure for carrying out the several purposes of the present invention. It is important, therefore, that the claims be regarded as including such equivalent construction so far as they do not depart from the spirit and scope of the present invention.

BRIEF DESCRIPTION OF THE DRAWINGS

Specific embodiment of the present invention has been chosen for the purpose of illustration and description, and is shown in the accompanying drawing, forming a part of the specification, in which.

DETAILED DESCRIPTION OF THE PREFERRED EMBODIMENTS

In the following, the present invention will be described in detail with reference to a preferred embodiment thereof shown in FIGS. 3 and 4.

Figure 1:
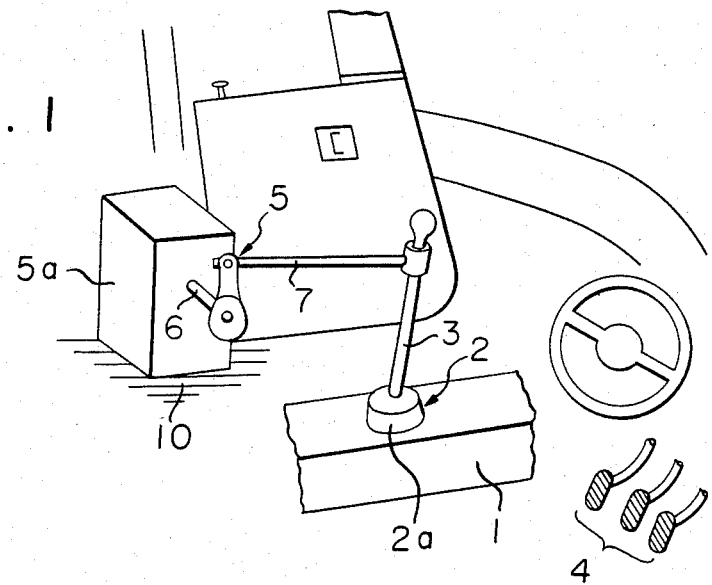
FIG. 1 is a perspective view showing a part of the speed changing mechanism operating device in the conventional automobile driving robot device.
Figure 2A:
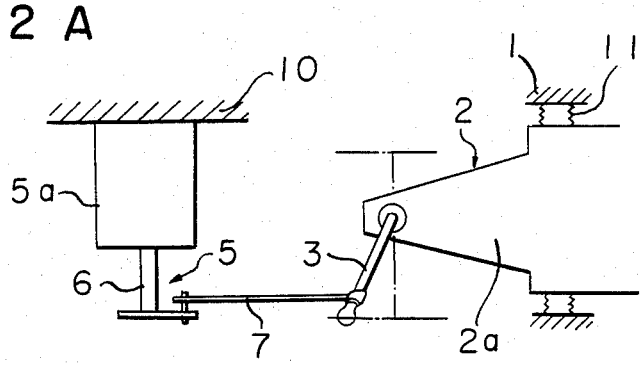
FIGS. 2A and 2B are respectively a plan view and a side view for explaining the principle of operation of the device according to the present invention.
Figure 2B:
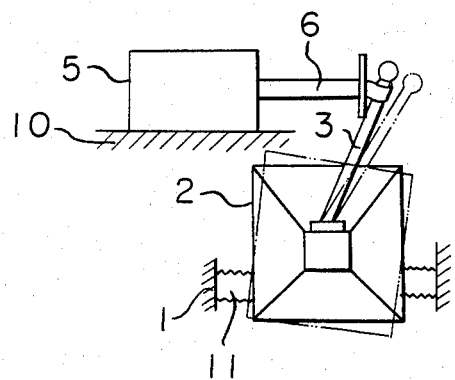
Figure 3:
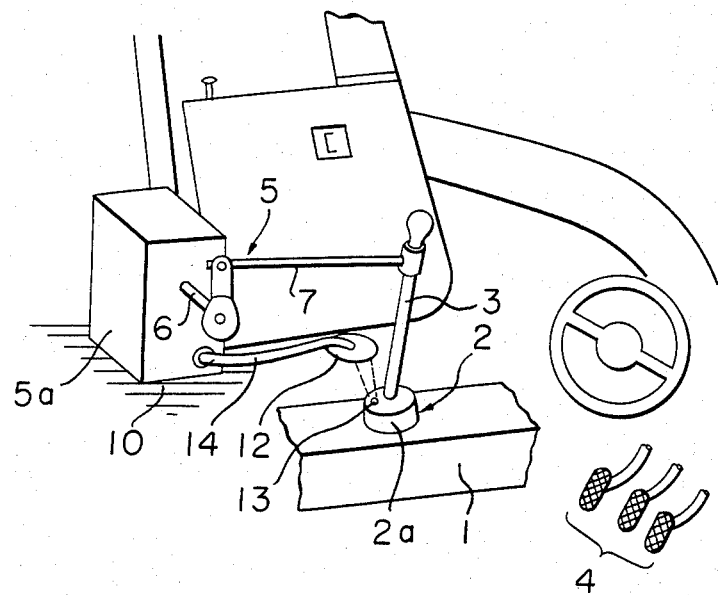
FIG. 3 is a perspective view of one embodiment of the speed changing mechanism operating device for the automobile driving robot device according to the present invention.
Figure 4:
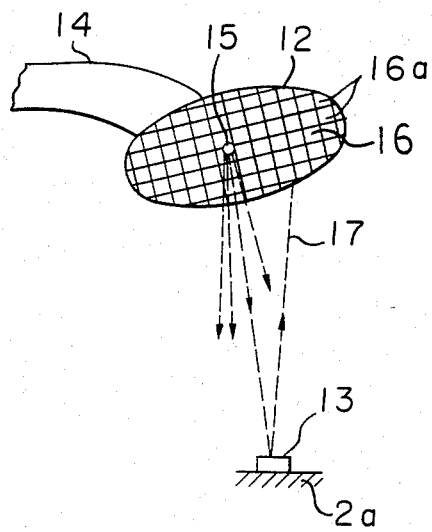
FIG. 4 is an enlarged explanatory diagram of a posture detector part in the speed changing mechanism operating device according to the present invention.

In FIG. 3, a reference numeral 12 designates a posture detector, a numeral 13 refers to a reflector for the posture detector provided on the top surface of the main body 2a of the speed changing mechanism 2, and a numeral 14 refers to a fitting piece, through which the abovementioned posture detector 12 is secured to the main body 5a of the speed changing mechanism operating device 5. As shown in FIG. 4, the abovementioned posture detector 12 is provided with a light projecting lamp 15 fixed at the center part thereof, and a light detector 16 for detecting a position of light reflected from the reflector 13 is disposed surrounding the light projecting lamp 15. The light detector 16 is of such a constuction that a multitude of light detecting elements 16 are arranged in both horizontal (X) and vertical (Y) rows so that to read a position of the reflected light as the detection data, when the reflected light is impinged on a particular light detecting element 16a. Incidentally, in FIG. 4, a numeral 17 shows, for the convenience of explanation, a path of light projected from the light projecting lamp 15. Moreover, it is to be understood that, in FIGS. 3 and 4, those reference numerals which are identical with those in FIG. 1 designate the same or equivalent parts in FIG. 1.

The abovementioned posture detector 12 is disposed below the operating link 7 at a height approximate to that, at which the operating link 7 is connected to the speed changing lever 3, and then, while adjusting its fitting posture, it is opposed to the reflector 13 is such a manner that the detecting surface of the light detector 16 on the posture detector 12 may be orthogonally intersected with a line connecting the centers of both light projecting lamp 15 and the reflector 13. Further, the direction of the reflector 13 is adjusted in such a manner that the reflector light may come back to substantially the center of the posture detector 12, after which the reflector 13 is firmly fixed to the main body 2a of the speed changing mechanism 2.

Since the transmission mechanism operating device according to the present invention is constructed as such, when the speed changing mechanism 2 is tilted or moved to the right or left direction as mentioned above accompanying tilting and moving of the reflector 13, there takes place movement of a light receiving point on the light detecting element 16a of the light 17 emitted from the light projecting lamp 15 and reflected by the reflector 13. Since the moving direction and distance of the reflecting point can be detected by the group of light detecting elements 16a constituting the light detector 16, the position and posture of the speed changing mechanism 2 are determined by appropriate means based on this detected signals, whereby the speed changing mechanism operating device 5 rectifies the reference point for the operation, and operates the speed changing lever 3 at a constant ratio corresponding to the moving direction and distance of the speed changing mechanism 2 to thereby hold the speed changing mechanism 2 relatively at its original position.

For instance, when the posture detector 16 detects that the speed changing mechanism 2 has moved to the right direction by one centimeter, or inclined rightward to bring about the same result as that where it has moved to the right direction by one centimeter, the operating shaft 6 of the speed changing mechanism operating device 5 is extended to rectify the reference point for operation of the speed changing mechanism operating device so that no shifting may be performed, since, in this shifted or inclined position, the speed changing lever 3 is shifted relatively to the left direction.

Incidentally, in the above-described embodiment, explanations have been given as to the construction, in which the posture detector is capable of detecting two dimensional movement of the speed changing mechanism, i.e., both left-and-right (horizontal) and back-and-forth (vertical) directions. However, the posture detector according to the present invention may also be a single dimensional construction, since, in the speed changing mechanism in general, most of the posture detector is practically sufficient to adjust the reference point for operating the speed changing mechanism operating device in the left-and-right direction alone. In this case, the reflector is not a spot reflector, but a plane reflector. It should be noted incidentally that the structure of the posture detector itself is not the subject of the present invention, but any type of posture detector may suffice the purpose, that is capable of detecting variations in the relative position between the speed changing mechanism operating device and the speed changing mechanism to be operated as well as variations in the relative position and moving direction of the speed changing mechanism with respect to the speed changing mechanism operating device. Moreover, rectification of the reference point for operation of the speed changing mechanism operating device may be done by any appropriate mechanism.

As has so far been described, the automobile driving robot device according to the present invention detects variations in the relative position of the speed changing mechanism to be operated with respect to the speed changing mechanism operating device, or variations in the relative position and posture between them, and rectifies the reference point for operation of the above-mentioned speed changing mechanism operating device, so that acurate and stable speed changing operations can be effected without unexpected speed changing operations being caused due to accidental shifting in speed changing mechanism, or the so-called gear disengagement being taken place, hence the function of the speed changing mechanism operating device can be exhibited to the fullest extent.

What is claimed as new and desired to the secured by Letters Patent of the United States is:

1. An automobile driving robot device having a speed changing mechanism operating device, said device being provided with means for detecting variations in a relative position between a speed changing mechanism to be operated and said speed changing mechanism operating device, and variations in the relative position and moving direction of said speed changing mechanism to be operated with respect to said speed changing mechanism operating device, and for rectifying a reference point operating said speed changing mechanism operating device, wherein said means for rectifying the reference point for operating the speed changing mechanism operating device comprises a light projecting lamp, a reflector mounted on the speed changing mechanism to be operated, and a light detector to detect light reflected from the reflector, thereby detecting the relative positional relationship between the speed of changing mechanism operating device and the speed changing mechanism to be operated.

2. The automobile driving robot device as set forth in claim 1, wherein said light detector consists of a multiple of light detecting elements arranged in a matrix pattern.

3. The automobile driving robot device as set forth in claim 2, wherein said light detector both moving direction and distance of the light receiving point of the reflected light.

4. An automobile driving robot device in combination with a speed changing device movable between at least two positions by movements in first and second orthogonal directions, said speed changing device being resiliently mounted to a vehicle such that a reference point of said speed change device can move in said first direction in response to an application of engine torque to said speed change device, said robot device comprising:

first means for moving said speed changing device in said first direction;

second means for moving said speed changing device in said second direction;

means for detecting movement of said reference point of said speed changing device in at least said first direction; and means for controlling said first means in response to a detected movement of said reference point in said first direction.

* * * * *